United States Patent [19]

Teijido et al.

[11] 4,321,991
[45] Mar. 30, 1982

[54] TORQUE RESPONSIVE DISCONNECT FOR A V-BELT DRIVEN ELEMENT

[75] Inventors: Joseph A. Teijido, Silvis City; Bernard F. Vogelaar, Moline City, both of Ill.

[73] Assignee: Deere & Company, Moline, Ill.

[21] Appl. No.: 115,821

[22] Filed: Jan. 28, 1980

[51] Int. Cl.³ .................. F16D 7/02; F16D 43/20; B60K 41/00
[52] U.S. Cl. ................... 192/0.034; 192/30 W; 192/3.58; 192/56 R; 474/19; 474/70; 56/10.3
[58] Field of Search ............... 192/0.034, 3.58, 30 W, 192/56 R, 150, 0.032, 56; 474/17, 19, 28, 70, 273; 56/10.3, 10.8, 10.9, 11.7, DIG. 15; 130/27 R

[56] References Cited

U.S. PATENT DOCUMENTS

| | | |
|---|---|---|
| 2,639,569 | 5/1953 | Pasturczak ................. 474/17 X |
| 3,093,946 | 6/1963 | Pitt et al. ................. 56/DIG. 15 |
| 3,195,364 | 7/1965 | Pauli ................................. 474/19 |
| 3,451,283 | 6/1969 | Rattunde . |
| 3,515,144 | 6/1970 | Morrison ................. 56/DIG. 15 |
| 3,600,960 | 8/1971 | Karig et al. . |
| 3,659,618 | 5/1972 | Kobald et al. ............. 56/DIG. 15 |
| 3,881,370 | 5/1975 | Vogelaar et al. . |
| 3,926,020 | 12/1975 | Dantowitz et al. .......... 474/28 X |
| 3,959,953 | 6/1976 | Garrott ...................... 56/DIG. 15 |
| 4,088,036 | 5/1978 | Hillman . |
| 4,138,837 | 2/1979 | Love . |

Primary Examiner—George H. Krizmanich

[57] ABSTRACT

In the variable speed V-belt drive of a combine harvester threshing cylinder, the driven sheave is torque-responsive, responding automatically to adjust drive belt tension according to the torque being transmitted. A linear hydraulic actuator, integral with the drive sheave, is used to adjust an axially movable sheave half with respect to a fixed sheave half so as to vary sheave effective diameter and hence driven speed. At any given speed setting, oil is trapped in the hydraulic actuator and oil pressure varies according to separating force between the halves of the drive sheave which in turn depends upon belt tension. A pressure switch, connected so as to sense the oil pressure, has a set point such that at a predetermined maximum (overload) belt tension, the switch is actuated so as to declutch or disconnect the drive sheave from its power source, thus protecting the threshing cylinder and drive components from damage. The signal from the pressure switch may be used also, or alternatively to actuate an operator warning signal.

11 Claims, 2 Drawing Figures

TORQUE RESPONSIVE DISCONNECT FOR A V-BELT DRIVEN ELEMENT

BACKGROUND OF THE INVENTION

The present invention relates to overload protection in a power transmission system using an endless member for transmitting power from one rotating member to another and, in particular, to overload protection in a variable speed V-belt drive of the type commonly used in mobile harvesting machines.

The mode of operation of variable speed V-belt drives is well known. Typically, power is transmitted between two shafts by means of drive and driven sheaves, both of which are made up of two halves axially adjustable in relation to each other, the axial adjustment changing the effective diameter of the sheave. The drive sheave may be adjusted hydraulically while the driven sheave is provided with spring means biasing the driven sheave halves in the direction of minimizing the space between them. Assuming the drive and driven shafts are at a fixed center distance, then adjusting the drive sheave to change the speed of the driven shaft will result in a compensating change in the driven sheave. For example, forcing the drive sheave halves together hydraulically so as to increase the effective diameter of the drive sheave will force the belt in the groove of the drive sheave outwards, momentarily increasing belt tension, and forcing the halves of the driven sheave apart, reducing its effective diameter until a new equilibrium condition is reached in which the driven shaft is turning faster than before and the drive belt is maintained at a tension sufficient for reasonable efficiency of drive transmission as a result of the spring force holding the halves of the driven sheave together.

It is well known to provide in the hydraulic control system for such a drive sheave, a pressure relief valve so as to limit the power which may be transmitted by the system. A variable speed V-belt drive with such a relief valve is described in U.S. Pat. No. 3,600,960, Karig. However, in many applications of such drives, a simple relief valve in the hydraulic system does not provide satisfactory protection against over-loading of the drive system. For example, in drives subject to widely fluctuating loading and/or the possibility of actually arresting or stopping the driven shaft but having only a power limiting hydraulic relief valve as described above, the relief valve essentially only determines the maximum belt tension which can be developed in the drive. Loading the drive beyond this power limit results merely in slipping of the drive belt with probable damage to the drive belt and possible fire risk from over-heating.

SUMMARY OF THE INVENTION

Accordingly, it is an object of the invention to provide in a V-belt drive an overload protection system which overcomes the disadvantages described above. More particularly, it is an object of the invention to provide an overload device responsive to an increase in drive belt tension above a predetermined limit so as to isolate a drive sheave from its power source so that the drive belt is not subject to excessive slipping and driven members connected to the driven shaft are not subjected to excessive overloading.

It is a further object of the invention to provide an overload control system particularly suitable for relatively high horsepower drives such as those of combine threshing and separating rotors or headers but comprising a relatively small number of largely conventional parts, comparatively low in total cost and simple and convenient to install and maintain.

It is a feature of the invention that an overload signal generated by excessive belt tension may be used to effect the disconnection of the drive sheave from the power source and/or may be used to actuate a warning device for a machine operator so that, for example, the operator receives warning not only that the drive has been interrupted but also an indication of the cause of the interruption or at least of the means by which the interruption was effected.

The invention may preferably, though not necessarily, be applied to a variable speed V-belt drive system and/or one in which the driven sheave is torque-responsive. A torque-responsive sheave includes means for biasing two cooperating sheave halves towards each other, with the biasing force varying directly with the torque transmitted by the sheave. Torque responsive sheaves are well known—see for example U.S. Pat. No. 3,881,370, Vogelaar et al. In such a drive, belt tension varies significantly and directly with torque transmitted and provides a measurable and predictable variable from which to derive an overload signal. Belt tension force results in a corresponding force in the direction of separating the two halves of a sheave. Changes in this axial separating force may be transduced to signal changes in belt tension. For example, when a drive sheave consists of two halves the axial spacing of which is controlled by fluid pressure as in a variable speed drive, the fluid system may be normally closed and pressure in it may vary directly with drive belt tension, an increase in belt tension tending to force the halves of the drive sheave apart by wedging action and increase the fluid pressure in the system. A transducer may be connected to the system to sense fluid pressure and, at a predetermined pressure, actuate means for disconnecting the drive sheave from the power source. The means for disconnecting the drive sheave from the power source may be an electric clutch or electrically actuated clutch and the transducer may be a fluid pressure actuated electrical switch controlling the electric clutch or electric actuator for a clutch and may also or alternatively actuate a visible or audible signal for warning a machine operator of an overload.

It is a feature of the invention that, depending as it does on changes in belt tension, it is particularly adaptable to a drive system including a torque-responsive driven sheave and that it may be effective to disconnect the drive sheave from its power source under a variety of overload conditions. Use of a torque-responsive driven sheave in a V-belt drive results in a drive belt tension relatively sensitive to loading of the driven members, making it unnecessary to have a transducer providing a highly accurate or predictable set point and making it possible to select a set point (maximum pressure) for the transducer, for example, relatively close to the stand-by or overall maximum relief pressure for a hydraulic variable speed control system.

It is an advantage of the invention that compared with overload protection systems that depend on speed reduction or "lugging down" it may provide protection from rapid increases of loading or "shock" overloading of driven members (typically a combination of high torque with low horsepower transmission) as well as from a gradually increasing overload (combining high torque and high horsepower transmission). Further, the invention may readily be adapted to include components such as the electrically actuated clutch mentioned above so that disconnection of the drive sheave from its power source and off-loading of the drive system so as to avoid damage may be almost instantaneous.

DESCRIPTION OF THE PREFERRED EMBODIMENT

Figure 1:
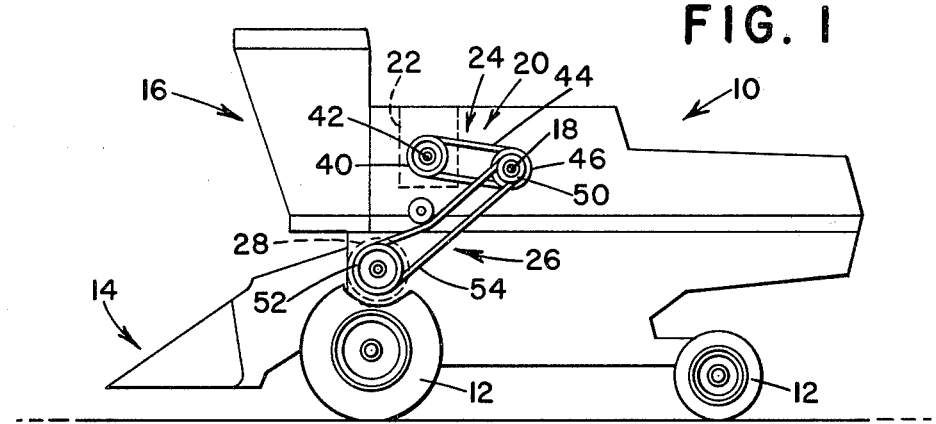
FIG. 1 is a simplified side elevation of a self-propelled combine harvester embodying the invention.

The invention is embodied in a component drive of a mobile crop handling or harvesting machine, such as the otherwise conventional self-propelled combine harvester represented by FIG. 1.

The combine separator body 10 is carried on wheels 12 and supports, forward mounted, a harvesting header 14 and an operator station 16. Much of the power for driving components of the combine is transmitted from a countershaft 18, itself powered as is conventional by a countershaft drive system 20 including an engine 22 and countershaft V-belt drive 24.

Only one of the combine component drives, the variable speed threshing cylinder drive 26, is shown in FIG. 1 and described here. It drives a conventional threshing cylinder 28, cooperating with a concave 30 (shown only in FIG. 2) and mounted on a cylinder input shaft 32 and supported in bearings 34 carried by the combine body 10. The threshing cylinder is an example of a crop engaging element—a power driven element in a crop handling or harvesting machine which engages material for processing and or conveying of the material.

Figure 2:
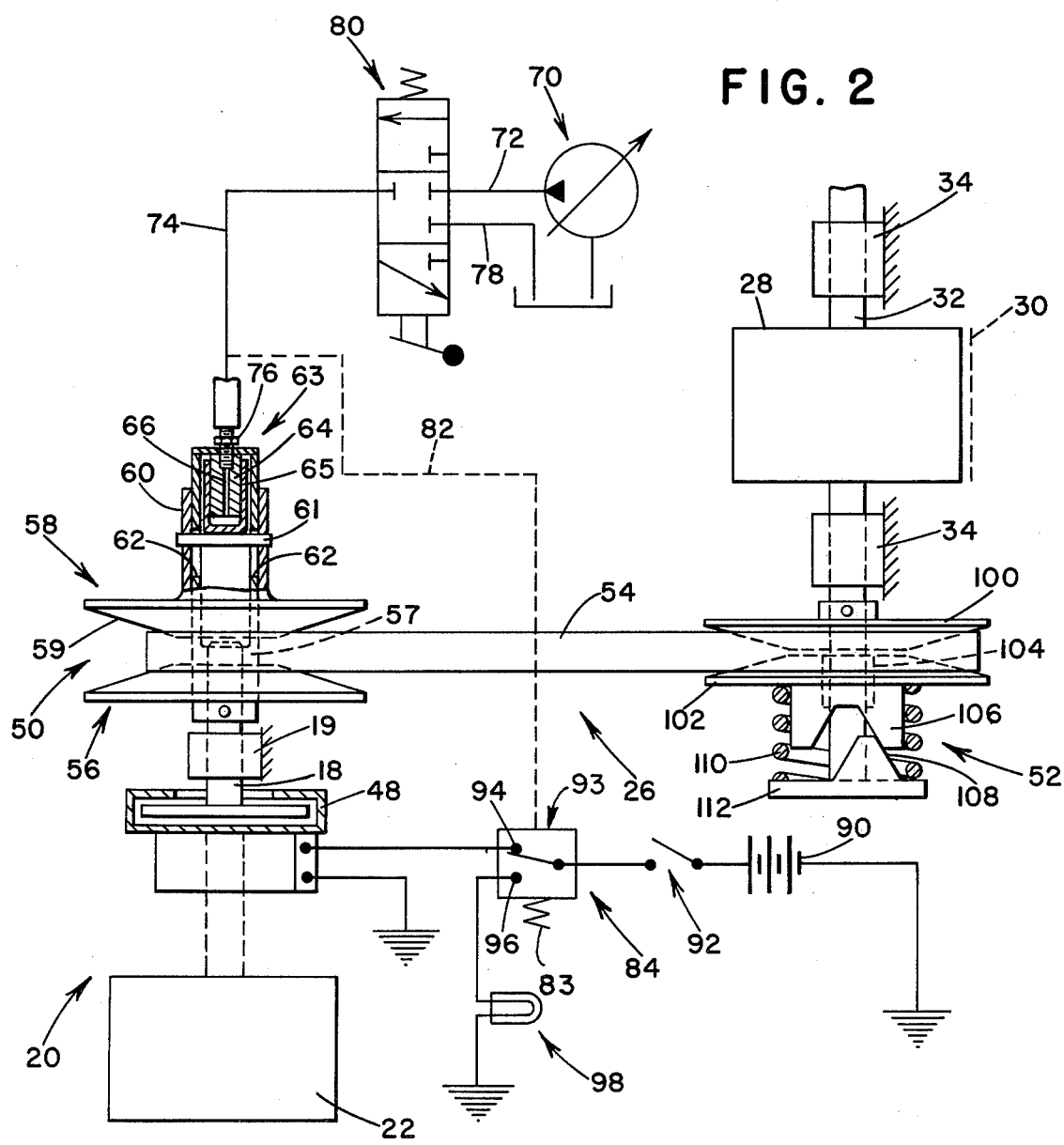
FIG. 2 is a simplified schematic representation of the drive system and controls for the threshing cylinder of the combine.

The countershaft V-belt drive 24 consists of a drive sheave 40, driven directly by the crankshaft 42 of the engine 22, a V-belt 44 and a driven sheave 46 mounted on the countershaft 18. A releasable coupling means such as the conventional electric clutch 48, shown only schematically in FIG. 2, associated with the driven sheave 46 is provided to complete the drive train between engine 22 and countershaft 18. In FIG. 2, to simplify the drawing, the countershaft drive system 20 is represented purely schematically.

The cylinder drive 26 includes a drive sheave assembly 50 mounted on the countershaft 18, a driven sheave assembly 52 mounted on the threshing cylinder shaft 32 and a V-belt 54 connecting them.

In the variable effective diameter drive sheave assembly 50, a fixed half 56 including an axially extending sleeve portion 57, is rigidly mounted on and turns with the countershaft 18. An axially adjustable sheave half assembly 58 includes a sheave half 59 and a sleeve portion 60 closely fitting the fixed sleeve 57 and permitting axial adjustment of the sheave half 59 relative to the fixed sheave half 56. A pin or key 61, retained in the sleeve portion 60 of the adjustable sheave half assembly 58, extends through axially extending slots 62 in the sleeve 57 so that the movable sheave half assembly 58 also turns with the shaft 18.

Adjustment of effective diameter of the drive sheave assembly 50 to vary the threshing cylinder speed, is controlled hydraulically by means of a hydraulic cylinder assembly (linear actuator) 63 rigidly attached to the end of the sleeve 57. A fixed piston 64 extends axially inside the sleeve 57 and carries a floating cylinder 65 which bears against the pin 61. A bore 66 in the piston 64 permits passage of hydraulic fluid to or from the cylinder 65 to control the position of the adjustable sheave half 58.

The single acting hydraulic speed control cylinder assembly 63, receives oil under pressure from a hydraulic power source 70 on the combine body 10 by way of hydraulic supply lines 72 and 74 and a hydraulic fitting 76 mounted in the hydraulic cylinder assembly 63 coaxial with the shaft 18 and communicating with the bore 66 in the piston 64 and permitting relative motion between the supply line 74 and the sheave assembly 50. Oil is returned to the power source 70 by way of the line 74 and a return line 78. Direction of flow of hydraulic fluid is controlled by a lever operated valve 80 mounted at the operator's station 16.

Hydraulic pressure in the cylinder 65 is sensed through a pilot line 82 by the pressure sensitive means 83 (mechanical or electronic for example) of a transducer such as the conventional pressure actuated electrical switch 84.

In FIG. 2, only that part of the combine electrical system concerned with operation of the overload protection system, is shown and that only in simplified schematic form. Electrical power for the clutch 48, is provided by an electrical power source 90 on the combine, subject to a manual clutch control switch 92 mounted at the operator's station 16 and the pressure switch 84. The pressure switch 84 also includes a switch portion 93, including first and second output terminals 94 and 96 respectively, and constituting a control means. The pressure switch 84 is normally closed with respect to a first output terminal 94 connected to the clutch 48. However, responsive to a hydraulic pressure increase in the speed control cylinder 65 beyond a set point, the pressure switch 84, acting as a transducer diverts or switches electrical power from the clutch 48 to a second output terminal 96 for powering another function, for example, a warning function such as an audible signal or a visual signal such as the light 98 indicated in FIG. 2.

The torque-responsive driven sheave assembly 52 is conventional and the function and operation of such sheaves is well known. See for example, U.S. Pat. Nos. 3,881,370, Vogelaar et al and 4,138,837, Love, both sharing a common assignee with the present invention. A fixed sheave half 100 is mounted rigidly on and drives the cylinder input shaft 32. The movable sheave half 102 is carried concentrically on the shaft 32 by a bearing 104 permitting both axial and rotational movement of the sheave half 102 relative to the shaft. The movable sheave half 102 carries a concentrically and axially extending cam sleeve 106 which engages a cooperating cam 108 attached rigidly to the shaft 32. A compression spring 110, contained between a flange 112 of the shaft cam 108, biases the movable sheave half 102 axially towards the fixed sheave half 100.

In operation, in preparation for entering a field of crop to be harvested and with the combine engine 22 running at a suitable speed, the operator manipulates the hydraulic control valve 80 to set the speed of the threshing cylinder to suit the crop to be harvested. The operation of hydraulically actuated variable speed V-belt drives such as the cylinder drive 26 is well known. Admission of hydraulic fluid under pressure to the speed control cylinder 65, for example, forces the movable sheave half 58 of the drive sheave assembly 50 closer to the fixed half 56—that is in the direction of increasing effective diameter. The V-belt 54 then rides at a greater diameter in the sheave 50 and a compensating effect at the driven sheave 52 has the movable sheave half 102 moving away from the fixed sheave half 100 (under the restraint or bias of the spring 110), so that the belt 54 rides lower in the sheave 52 and the ratio of the speed of the countershaft 18 to the threshing cylinder shaft 32 is increased. For relative speed reduction, appropriate movement of the control valve 80 connects the supply line 74 with the return line 80 and tension in the belt 54 creates a wedging action which tends to separate the halves of the drive sheave 50 so that the movable sheave half 58 moves to expel oil from the cylinder 65. Again, the effective diameters of the drive and driven sheaves 50 and 52 change to effect a speed ratio change.

When the combine moves into a crop to begin harvesting, the header 14 gathers and feeds crop material to the space between the threshing cylinder 28 and concave 30 and threshing and separating of the crop material begins and a load (typically varying considerably) is thus imposed on the drive system. With the control valve 80 centered as indicated in FIG. 2, oil is trapped in the hydraulic system of the adjustable sheave 50 and its pressure bears a direct relationship to tension of the belt 54 (due to the separating effect on the sheave halves) which in turn is directly related to the torque being transmitted to the threshing cylinder 28. As is well known, the function of a torque-responsive sheave (often called a torque-sensing sheave), such as the sheave assembly 52, is to respond to changes in torque transmitted by adjusting, through cam action, the force of biasing one sheave half towards the other, so as to provide appropriate tension in the drive belt 54. The torque transmitted by the sheave 52 is of course directly related to the loading of the threshing cylinder so that the pressure in the drive sheave hydraulic system is directly related to threshing cylinder load.

The set point (actuating pressure) of the pressure switch 84, is chosen to be somewhat above the upper end of the range of pressures developed in the hydraulic system by what are considered normal operating conditions. When the threshing cylinder becomes overloaded through actual or incipient plugging due to substantial changes in crop condition or operator error or possibly a malfunction or other problems, it is desirable to interrupt the drive to the cylinder so as to minimize damage throughout the system (including damage and risk of fire from belt slippage or other mechanical damage) and to limit the problem of plugging or incipient plugging where continued running may intensify it. An overload protection system according to the mode of the present invention and including an automatic disconnect provides such rapid drive interruption by instantaneously deenergizing the clutch 48 thus isolating the cylinder drive 26 from its power source (engine 22). An advantage of the present system is that because the drive sheave 50 is disconnected, the entire threshing cylinder drive 26 is disconnected from the power source so that there is no possibility of prolonged and damaging slippage of the V-belt 54. Disconnection does not depend on a speed reduction or "lugging down".

As suggested in FIG. 2, the signal (excessive pressure) effecting interruption of the drive to the cylinder may also be used instead, or simultaneously, to actuate a warning to the operator, such as the light 98, indicating to the operator that a particular drive (in this embodiment—the cylinder drive) has been overloaded and/or interrupted. Thus the drive disconnect (electric clutch 48) and/or the warning signal (light 98) constitute protective apparatus—functioning either automatically to disconnect the power source or to warn the operator to take corrective action, such as reducing feed rate to the crop engaging element (threshing cylinder 28) or interrupting the drive to the element by means of manual switch 92 so as to reduce or relieve tension in the V-belt drive (threshing cylinder drive 26). The operator should of course identify and rectify the problem before re-engaging the drive.

Note that, in the system described here, where the mode of power disconnect is declutching of a countershaft, the drive of any other part of the combine receiving power from the countershaft will also be interrupted, as is generally desirable.

In a typical V-belt drive with a torque-responsive driven sheave, belt tension is quite sensitive to changes in torque and levels of belt tension are relatively predictable. This makes it possible and preferable in practising the present invention to choose a relatively low set point for the pressure switch, close to the upper range of pressures corresponding to normal operation with only nominal risk of nuisance shutdowns. Life expectancy of drive components, particularly the V-belt, or risk of component damage need not be compromised for the sake of minimizing nuisance shutdowns or interruptions. For example, successful operation can be expected in the embodiment here described when the pressure switch 84 has a set point of 800 to 1000 psi and is backed up by a system pressure relief valve having a set point of 1250 psi.

We claim:

1. In a mobile harvester for gathering and processing crop material, having a power source and an operator's station for a harvester operator and a V-belt drive for a crop engaging element in which belt tension varies according to the loads imposed on the crop engaging element by the crop material and including a driven sheave drivingly connected to the crop engaging element and a drive sheave drivably connected to the power source and having co-axial sheave halves, each half having an inclined frusto-conical surface, said surfaces being opposed and disposed so as to define a V-groove opening towards the sheave periphery, and a V-belt trained around and connecting the drive and driven sheaves and engaging the V-groove, the tension of the V-belt pulling the belt radially inwards in the groove and creating a wedging action between the halves of the drive sheave and tending to separate them axially with an axially separating force that varies directly with belt tension, the improvement in the V-belt drive comprising:

a protective apparatus operable to relieve belt tension in the V-belt drive; and a transducer for sensing the axially separating force effective on the drive sheave halves and actuating the protective apparatus when the belt tension reaches a predetermined level.

2. The invention defined in claim 1 wherein the protective apparatus includes automatic means responsive to the transducer for disconnecting the drive sheave from the power source.

3. The invention defined in claim 1 wherein the protective apparatus includes a warning indicator responsive to the transducer and effective at the operator's station to warn the operator that V-belt tension has exceeded the predetermined level.

4. The invention defined in claim 1 wherein the transducer includes fluid means for resisting the axially separating force so as to generate a fluid pressure and a pressure switch responsive to a fluid pressure corresponding to the predetermined level of belt tension.

5. The invention defined in claim 1 and further including torque-responsive means operatively associated with the driven sheave for automatically adjusting V-belt tension according to torque transmitted by the V-belt drive.

6. In a combine harvester having a power source and a torque sensitive drive for a crop engaging element of the harvester in which drive belt tension is adjusted automatically in direct response to changes in torque transmitted to the crop engaging element, the drive including a drive sheave drivingly connected to the power source and having co-axial sheave halves, each sheave half having an inclined frusto-conical surface, said surfaces being opposed and disposed so as to define a V-groove diverging towards the sheave periphery, and a V-belt trained around the sheave and engaging the V-groove for transmitting power to the crop engaging element, the V-belt being pulled radially inwards in the groove when transmitting power and having a wedging action in the V-groove so as to generate an axially separating force between the sheave halves, the improvement in the torque sensitive drive comprising:
 a warning apparatus for giving warning of an overload of the crop engaging element;
 means for sensing the axially separating force imposed between the respective halves of the drive sheave by the drive belt so as to generate a belt tension signal when the belt tension equals or exceeds a predetermined level corresponding to the overload; and
 control means operatively associated with the sensing means and responsive to the signal to actuate the warning apparatus.

7. The invention defined in claim 6 wherein the warning apparatus includes a releasable clutch interposed between the drive sheave and the power source and the belt tension signal is transduced to operate the clutch so as to disconnect the drive sheave from the power source.

8. The invention defined in claim 6 wherein the belt tension signal is effective to disconnect the drive sheave from the power source and to actuate a warning indicator.

9. In a variable speed torque responsive V-belt drive for a crop engaging element of a combine harvester, the combine including a power source and means for delivering crop material to the element, the element being subjectable to varying loading according to harvest operating conditions and the drive including a drive sheave having cooperating axially separable halves, connected to and driven by the power source and defining between them a V-groove, and means for disengaging the power source from the drive sheave, a driven sheave connected to and driving the crop engaging element, and a V-belt trained around the drive and driven sheaves for transmitting power between them and engaging the V-groove, tension in the belt tending to pull the belt radially inwards in the V-groove, developing an axial separating force between the drive sheave halves, the driven sheave being responsive to changes in torque transmitted to the crop engaging element so as to effect corresponding changes in belt tension, said changes in belt tension resulting in corresponding changes in the axially separating force between the drive sheave halves, the improvement comprising:
 control means operatively associated with the drive sheave and responsive to changes in the axially separating force between the drive sheave halves so as to actuate the means for disengaging the power source from the drive sheave when the axially separating force exceeds a predetermined level.

10. In a machine for handling crop material having sources of mechanical, electrical and hydraulic power and at least one power driven element for engaging crop material and conveying or processing it and having an input shaft, the machine including means for delivering crop material to the element in a manner which may vary with regard to the quantity and consistency of the material so as to impose a varying load on the element, an improved drive system for the crop material engaging element comprising:
 a drive sheave connected to and driven by the mechanical power source comprising co-axial sheave halves having opposing frusto-conical faces defining a V-groove and axially adjustable so as to vary the effective diameter of the V-groove;
 clutch means operable to disengage the mechanical power source from the drive sheave;
 hydraulic control means connected between the hydraulic power source and the drive sheave and operable to axially adjust the sheave halves so as to change the effective diameter of the V-groove and including an enclosure for containing hydraulic fluid and a valve for closing the enclosure, pressure in the enclosure being sensitive to axial forces on at least one of the sheave halves when the valve is closed;
 a driven sheave, co-axial with and driving the input shaft including a first sheave half, a second sheave half co-axial with and axially shiftable relative to the first sheave half and cooperating with it so as to define a variable effective diameter V-belt groove, at least one of the sheave halves being rotationally deflectable relative to the input shaft, and automatic means co-axial with the driven sheave halves for axially biasing the second sheave half towards the first sheave half and adjusting the effective diameter in response to rotational deflection between the driven sheave and the input shaft caused by changes in the torque transmitted through the input shaft to the crop engaging element;
 a V-belt trained around the drive and driven sheaves engaging the driven sheave at its effective diameter for transmitting power from the drive sheave to the driven sheave, the automatic adjustment of the driven sheave causing belt tension to vary directly with changes in the torque transmitted by the driven sheave and the tension in the belt tending to separate the halves of the drive sheave and creating an axially separating force which sets up a resisting fluid pressure in the enclosure which varies directly with belt tension and maintains the drive sheave in a selected adjustment condition; and
 control means operatively associated with the hydraulic control means and with the clutch means and responsive to changes in fluid pressure in the enclosure so as to actuate the clutch means when the fluid pressure reaches or exceeds a predetermined level and interrupt the drive from the mechanical power source to the crop engaging element.

11. The invention defined in claim 10 wherein the clutch means is electrically operated and the control means includes a pressure switch having an electrical switch portion connected between the electrical power source and the clutch means and a pressure sensing portion communicating with the enclosure of the hydraulic control means.

* * * * *